May 6, 1930.  C. F. HIGGINS  1,757,191
DUMPING VEHICLE HOIST
Filed April 3, 1925   3 Sheets-Sheet 1
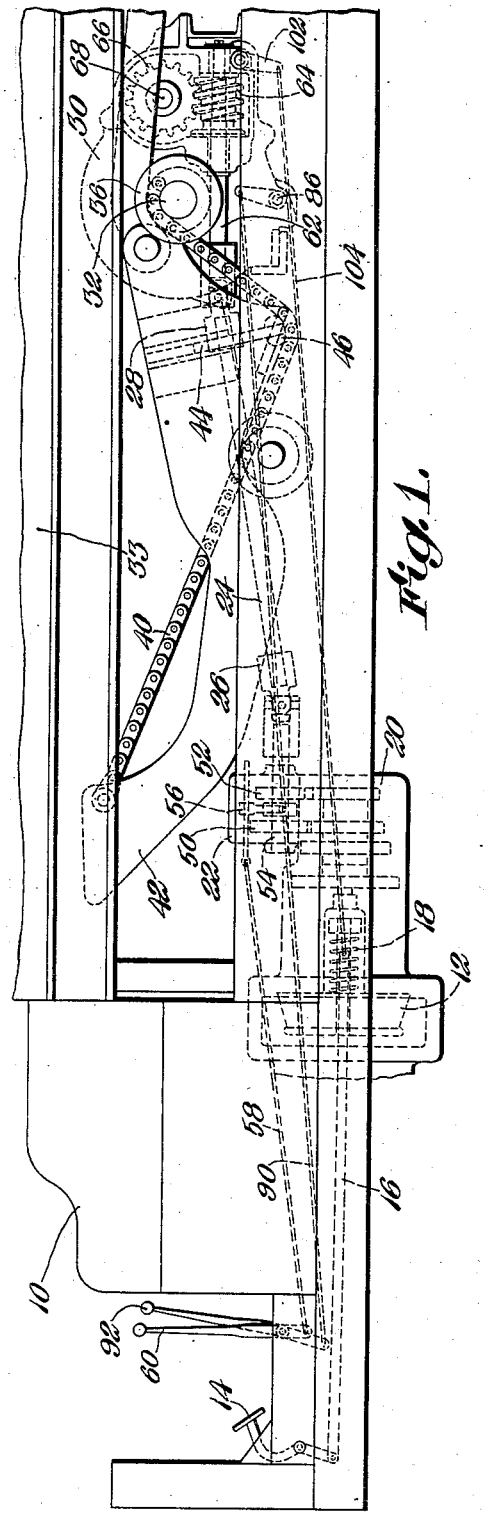
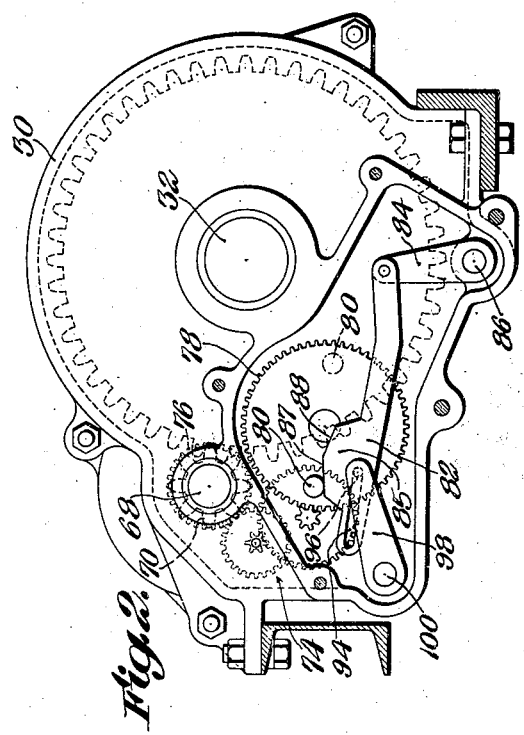
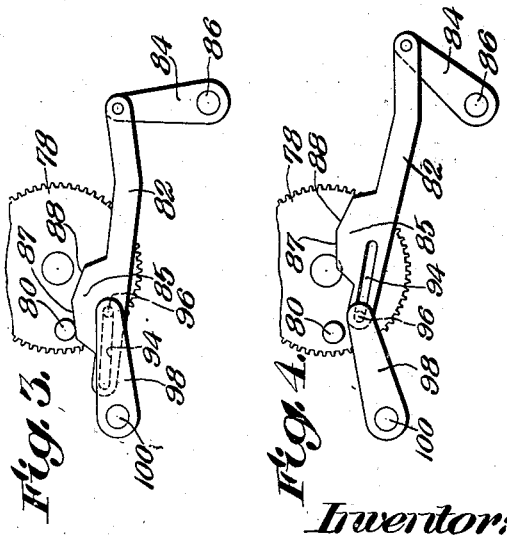
Inventor:
Clark F. Higgins
by Van Evera Fish
Hildreth Hary
Attys.

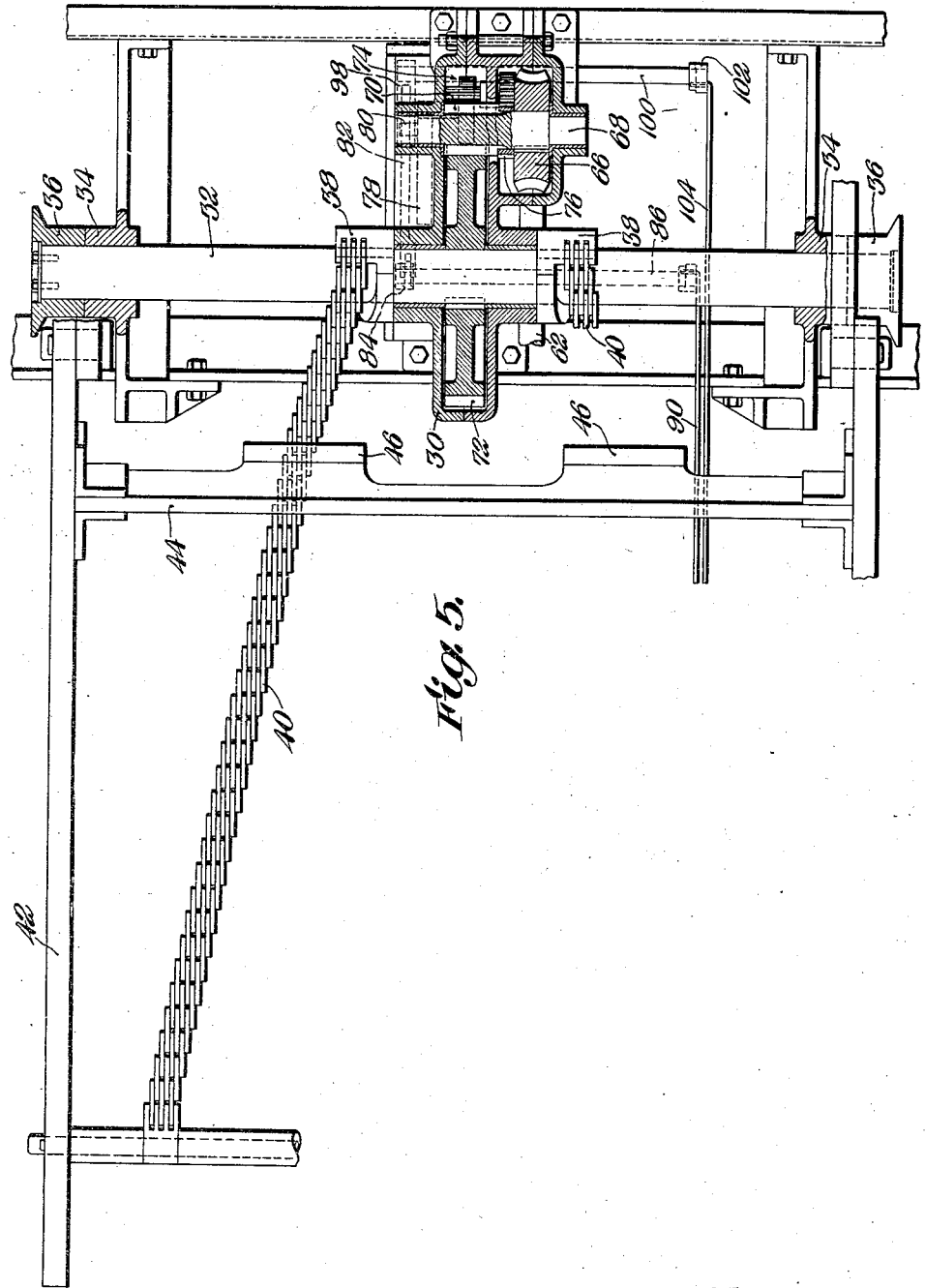

May 6, 1930. C. F. HIGGINS 1,757,191
DUMPING VEHICLE HOIST
Filed April 3, 1925  3 Sheets-Sheet 3

Inventor:
Clark F. Higgins
by Van Everen Fish
Hildreth & Craig Attys.

Patented May 6, 1930

1,757,191

UNITED STATES PATENT OFFICE

CLARK F. HIGGINS, OF MELROSE, MASSACHUSETTS

DUMPING VEHICLE HOIST

Application filed April 3, 1925. Serial No. 20,379.

The present invention relates to dumping vehicle hoists and more particularly to hoisting mechanisms adapted for operation by the engine of the vehicle.

The objects of the present invention are to provide a hoisting mechanism operated from the engine and having provision for automatically stopping the mechanism at the limit of movement of the vehicle body and also to provide for efficient and uniform actuation of the hoisting means to elevate the body of the vehicle.

With these objects in view, one feature of the invention resides in the provision of a hoisting mechanism adapted to be connected with the engine of the vehicle and a timing gear train operatively connected with the hoisting mechanism and adapted to disconnect the mechanism from the engine as the body reaches the limit of its movement either in being hoisted or in returning to its original position.

Another feature of the invention resides in the employment of hoisting chains operatively connecting the hoisting gearing with the body and formed with offset links to provide for helical winding of the chains upon the shaft. By the provision of a plurality of such chains connected with the body of the vehicle, regular and uniform winding and uniform lifting stresses on the body at all points are insured.

Still further features of the invention consist in certain novel features of construction, combinations, and arrangements of parts hereinafter described and particularly defined in the claims.

Figure 7:
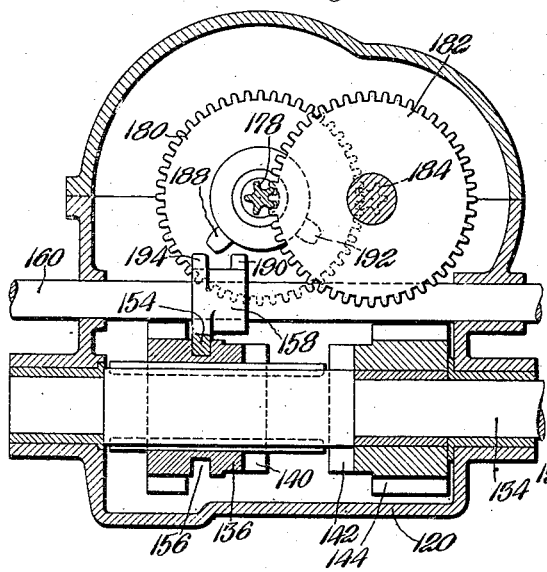
Figure 8:
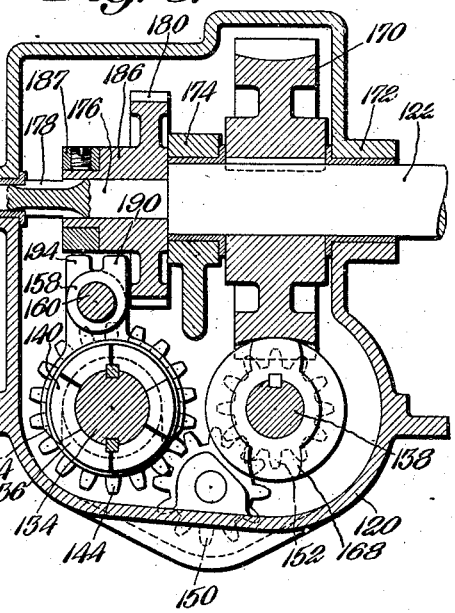
Figure 9:
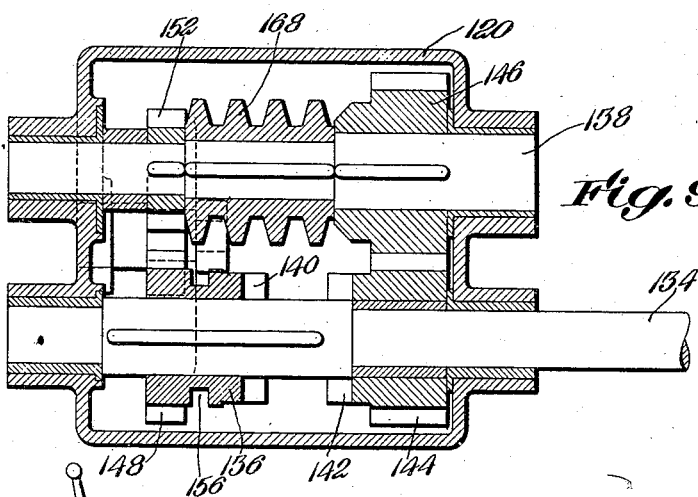
Figure 6:
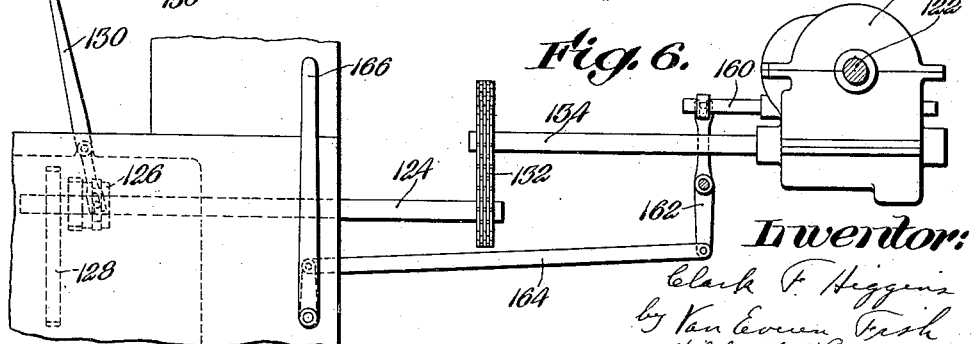

In the accompanying drawings Fig. 1 is a side view of a portion of a vehicle provided with a gearing mechanism embodying the features of the present invention; Fig. 2 is a side elevation of the gearing casing viewed from the opposite side from Fig. 1, certain of the parts being broken away; Fig. 3 is a detail view of the automatic mechanism for stopping the operation of the hoist; Fig. 4 is a view similar to Fig. 3 showing a different position of the parts; Fig. 5 is a plan view partly in section showing the hoisting mechanism; Fig. 6 is a partially diagrammatic elevation of a modification of the hoisting mechanism; Fig. 7 is a sectional elevation of the gearing mechanism shown in Fig. 6; Fig. 8 is a transverse sectional elevation of the parts shown in Fig. 7; and Fig. 9 is a horizontal section of the mechanism shown in Fig. 7.

In the form of the invention illustrated in Figs. 1 to 5, the vehicle 10, having an engine (not shown), is provided with a clutch 12 consisting of opposed conical elements of the usual form, one of which is connected with the usual clutch pedal 14 through a link 16, the clutch members being normally urged toward closed position by a spring 18. The clutch connects through a transmission indicated generally at 20 with a drive of any suitable form leading to the rear wheels of the vehicle. Connected with the transmission casing is a power take-off 22 connecting through a shaft 24 and universal joints 26 and 28 with a hoist gearing mechanism contained in the casing 30. The hoist gearing when operatively connected with the transmission through the power take-off 22, as will presently be described, operates to rotate a chain shaft or winding shaft 32 journaled in bearings 34 at opposite sides of the vehicle frame, the shaft being held from endwise movement by caps 36 secured thereto outside the bearings. Secured to the shaft at opposite sides of the gearing casing are chain-connecting lugs 38 to each of which is attached the end of a chain 40 which is connected at its free end with a hoist arm 42. The hoist arm may be of any usual or preferred form adapted for connection with the body 33 of the vehicle to elevate the body as the chain is wound upon the shaft by rotation of the latter. In the preferred form of the invention, the hoist in general form is similar to that shown in the patent to Lally, No. 1,387,413, the arms on opposite sides of the vehicle being connected by a depending strut 44 having enlarged bearing surfaces 46 under which the chains lead to impart an initial upward thrust to the body upon the start of the winding operation. As shown in Fig. 5, the chains are of offset link construction, being arranged so that upon rotation of the shaft adjacent convolutions of the chain lie closely side by side, and wind helically upon and in contact with the shaft. Due to the uniform winding of both chains on the shaft, this construction insures regular and uniform tensions on both chains during the entire hoisting operation, so that the body is lifted uniformly and without being subjected to objectionable side stresses.

The power take-off 22, as shown in Fig. 1, comprises two gears 50 and 52 adapted for permanent meshing with suitable gears of the transmission 20 and arranged so that they are rotated in reverse directions. The gears are loosely mounted on a shaft 54 to which either the gear 50 or the gear 52 may be clutched by means of a clutch splined on the shaft 54 and engaged by a yoke 56 connected through a rod 58 with a hand lever 60 at the operator's seat in any suitable manner, as will be obvious to those skilled in the art. It will be seen that upon proper manipulation of the hand lever 60, the shaft 54 and consequently the shaft 24 may be caused to rotate in either direction. The shaft 24 connects through the universal joint 28 with a shaft 62 in the gearing casing, which shaft carries a worm 64 meshing with a worm gear 66 on a shaft 68 journaled in the casing. The shaft 68 is formed with a pinion gear 70 which meshes with a chain shaft driving gear 72 secured to the chain shaft 32. Upon rotation of the shaft 24 in one direction due to the connection of one of the gears of the power take-off therewith the chain shaft 32 is rotated to elevate the body, and upon rotation of the shaft in the opposite direction the body is connected with the hoisting mechanism to be returned to its original position.

Provision is made for manually controlling the direction of operation of the above described parts and for automatically shipping the clutch as the body approaches the limit of its movement in either direction. For this latter purpose a timing gear train indicated generally at 74 in Fig. 2 is operated upon rotation of the shaft, the initial gear 76 of the train being mounted on the worm gear shaft 68 and leading through a series of reducing gears to rotate the timing gear 78. The gear 78 is provided with a pin 80 which is in the position indicated in dot-and-dash lines in Fig. 2 when the body is in lowered position, and which moves in a counter-clockwise direction with the gear 78 as the body is elevated. The pin cooperates with a link 82 pivoted at one end to an arm 84 which is connected through a rock shaft 86 with an arm externally of the casing, this latter arm connecting through a rod 90 with a hand lever 92 placed near the seat of the operator. The link 82 has a projection 85 provided with oppositely inclined surfaces 87 and 88 which are adapted to be selectively placed in the path of movement of the pin by operation of the lever 92 for determining the operation of the timing mechanism. The degree of movement imparted to the link by operation of the lever 92 is such that at one limit of movement the surface 87 is brought into the path of the pin 80 to control the operation of the hoisting mechanism as the gear turns in a counter-clockwise direction corresponding to an elevation of the body, and the surface 88 brought into the path of the pin 80 as the gear rotates in the reverse direction, corresponding to a movement of the body to its original position. The link is provided at its rear end with a slot 94 within which is received a pin 96 on a clutch shipper arm 98 connected through a rock shaft 100 with an exterior arm 102 which in turn is connected by a rod 104 with the clutch pedal link 16 in such a manner that upon rotation of the shipper arm 98 the rod 104 will be pulled upon to separate the elements of the clutch.

The operation of the above mentioned parts is described as follows: While the body is in horizontal or carrying position, the parts are in the position shown in Fig. 2 with the pin 80 in the position indicated in dot-and-dash lines. During the hoisting operation the chain shaft 32 rotates in a counter-clockwise direction, as viewed in Fig. 2, thus moving the timing gear 78 also in a counter-clockwise direction. As the body approaches the limit of its hoisting movement, the pin 80 comes into contact with the surface 87 of the link 84 as shown in Fig. 2, and upon further movement it depresses the link into the position shown in Fig. 3, thus rotating the shipper arm 98 and drawing upon the shipper rod 104 to separate the clutch elements. The body is thus retained in duping position, being prevented from returning under its own weight by virtue of the engagement of the worm gear 66 with the worm 64. After the dumping operation has been completed the hand lever 60 is actuated to connect the power take-off with its shaft 54 in such a way that the shaft 24 and the gear shaft 62 will be rotated in the opposite direction, to turn the chain shaft in a clockwise direction, as viewed in Fig. 2, to lower the body to its original position. After the operation of the lever 60, the lever 92 is moved to carry the link 82 into the position shown in Fig. 4, so that its surface 88 will lie in the path of the pin 80 upon the return of the timing gear 78 to its initial position. This movement of the link 82 from under the pin 80 frees the clutch shipper arm 98 and permits it to rise so that the clutch elements are engaged by the action of the clutch spring 18. The body then returns to its horizontal position, the pin 80 finally arriving into engagement with the surface 88 of the link 82, thus depressing it and at the same time turning the clutch shipper arm 98 about the rock shaft 100 to separate the clutch elements as before. The arm 60 is then moved so that the power take-off is in neutral, in order that rotation of the transmission gears in driving the vehicle will not operate the hoisting mechanism. The lever 92 may then be moved so that the surface 88 of the link 84 is removed from under the pin 80, thus permitting the clutch shipper arm 98 to rise and allow the clutch elements to engage with each other. The vehicle is now ready to be driven in the usual way by the driving connection from the engine through the clutch and transmission to the rear wheels.

A modified and, in some respects, preferable form of the invention is shown in Figs. 6 to 9. In this form the clutch and reversing drive are contained within the hoist gearing casing, and provision is made for a one-direction take-off from the transmission to the hoist gearing. As shown in Fig. 6, the gear casing 120, within which is journaled the chain shaft 122 similar to the shaft 32, is mounted at one side of the vehicle rather than at the center, as in the first described form, the hoisting chains, however, being adapted for connection to the shaft in an exactly similar manner. A shaft 124 carrying a sliding gear 126 constitutes the power take-off, the gear at 126 being adapted for engagement with a gear 128 of the transmission by means of an operating lever 130. The shaft 124 connects through a sprocket chain 132 and suitable gears with a shaft 134 entering the gear casing 120. The shaft 134 has splined thereon for longitudinal movement a clutch member 136 adapted to transmit the movement of the shaft 134 to operate a worm shaft 138 in either direction. For this purpose the clutch member 136 is provided with a series of end face teeth 140 adapted to cooperate with similarly formed teeth 142 on a gear 144 which is rotatable on the shaft 134 and is permanently in mesh with a gear 146 keyed to the worm shaft 138. The clutch member at the limit of its right-hand movement, as viewed in Fig. 9, is adapted to engage with the gear 144 through the teeth 140 and 142, and it is provided with a gear 148, which at the limit of its left-hand movement engages with an idler 150 journaled in the casing and engaging in turn with a gear 152 keyed to the worm shaft 138. A shifter yoke 154 received in a groove 156 in the clutch member and having a hub 158 secured to a shifter rod 160 provides for moving the clutch member to engage with either the gear 144 or the idler 150, or to be placed in a neutral position between them. The actuating rod 160 connects through a pivoted arm 162 with a link 164 adapted to be actuated by a hand lever 166 to move the clutch member to any desired position on the shaft 134. On the worm shaft 138 is a worm 168 which meshes with a worm gear 170 secured to the chain shaft 122, which is journaled in a bearing 172 in the side of the casing and a bearing 174 projecting from the central portion of the casing. It will be seen that upon actuation of the lever 166 to engage the clutch member with the gear 144 the chain shaft will be rotated in one direction, and upon engagement of the gear 148 with the idler 150 the chain shaft will be rotated in the opposite direction, so that the body may be raised or lowered as desired.

The timing mechanism is described as follows: Formed integral with the chain shaft 122 is a shaft 176 journaled in the side of the gear casing and provided with a gear 178 which drives a timing gear 180 through intermediate gears 182 and 184. The timing gear 180 has a hub 186 upon which is formed a lug 188 adapted to engage a projection 190 on the clutch shifter hub 158 as the gear is rotated. Adjustably secured to the hub 186 is a collar 187 which has a projection 192 adapted to engage with a projection 194 on the clutch shifter hub when the timing gear is rotated in the opposite direction. The provision for relative movement between the hub 186 and the collar 187 permits adjustment between the projections 188 and 192. Assuming that the parts are in the position indicated in Fig. 7 with the gear 148 in engagement with the idler 150 to rotate the chain shaft 122 to give a hoisting movement to the body, as the body approaches the limit of its elevation the lug 188 engages with the projection 190 and moves the yoke to neutral position, thus disconnecting the shaft 134 from the worm shaft and prevent further lifting stress from being applied to the body. The body is maintained in elevated position against the action of gravity by the engagement of the worm gear 170 with its worm 168. To return the body to initial position it is necessary to engage the clutch member 136 with the gear 144 through their end face teeth, thus rotating the chain shaft in the opposite direction. As the body arrives at its horizontal position, the clutch is thrown to neutral position by the movement of the shifter yoke through engagement of the projections 192 and 194. The hoist gearing may then be entirely disconnected from its operating source by disengaging the gears 126 and 128, thus permitting the vehicle to be driven in the usual manner.

Having thus described the invention, what is claimed is:

1. A dumping vehicle hoist having, in combination, a body, a power-operated shaft, a winding shaft, a clutch member on the power-operated shaft, gearing adapted to engage with the clutch member to drive the winding shaft in either direction, a clutch shifter for causing engagement of the clutch member with the gearing to drive the winding shaft, the clutch shifter having offset projections, a manual control for the clutch shifter, timing gearing operated by the winding shaft, and a pair of offset lugs carried by the timing gearing to engage with the projections of the shifter, one of which lugs is adapted to throw the clutch into neutral position as the body approaches the limit of its movement in one direction, and the other of which is adapted to throw the clutch into neutral as the body approaches the limit of its movement in the other direction.

2. A dumping vehicle hoist having, in combination, a driven shaft, a hoisting shaft, a clutch member splined on the driven shaft, a clutch shifter for moving the clutch member longitudinally of the driven shaft and having a pair of projections, gearing adapted to engage with the clutch member at the limits of its longitudinal movement to drive the winding shaft in either direction, a timing gear driven by the winding shaft, a lug carried by the timing gear adapted to engage one of the projections of the clutch shifter, a second lug operated by the timing gear and adapted to engage with the other projection of the clutch shifter upon movement of the winding shaft in the reverse direction, whereby the clutch is moved to neutral position as the body approaches the limit of its movement in either direction, and means permitting adjustment of the timing gear lugs relatively to each other.

In testimony whereof I have signed my name to this specification.

CLARK F. HIGGINS.